J. W. JORDAN.
BEEHIVE.
APPLICATION FILED MAR. 7, 1916.
1,211,587.
Patented Jan. 9, 1917.
3 SHEETS—SHEET 2.
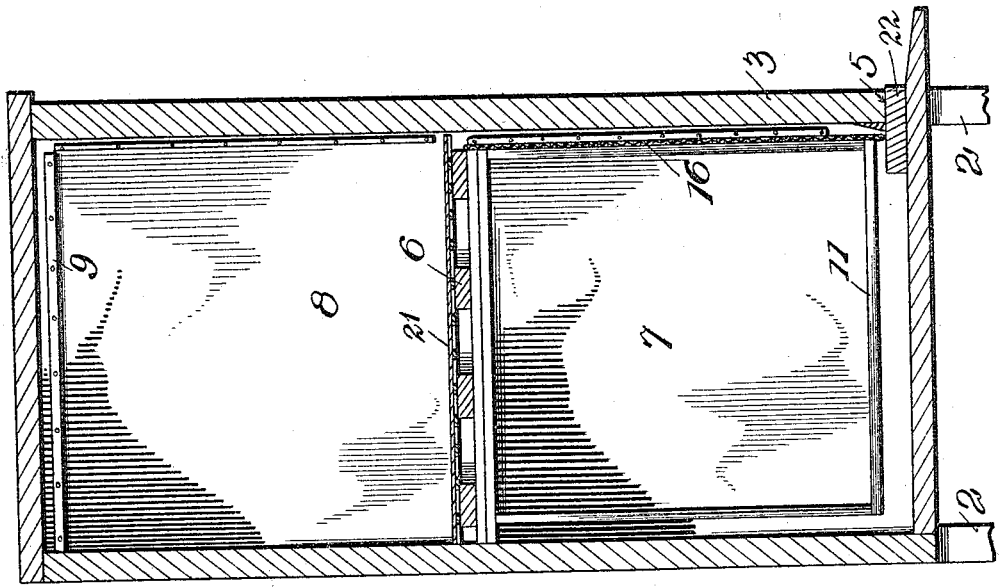
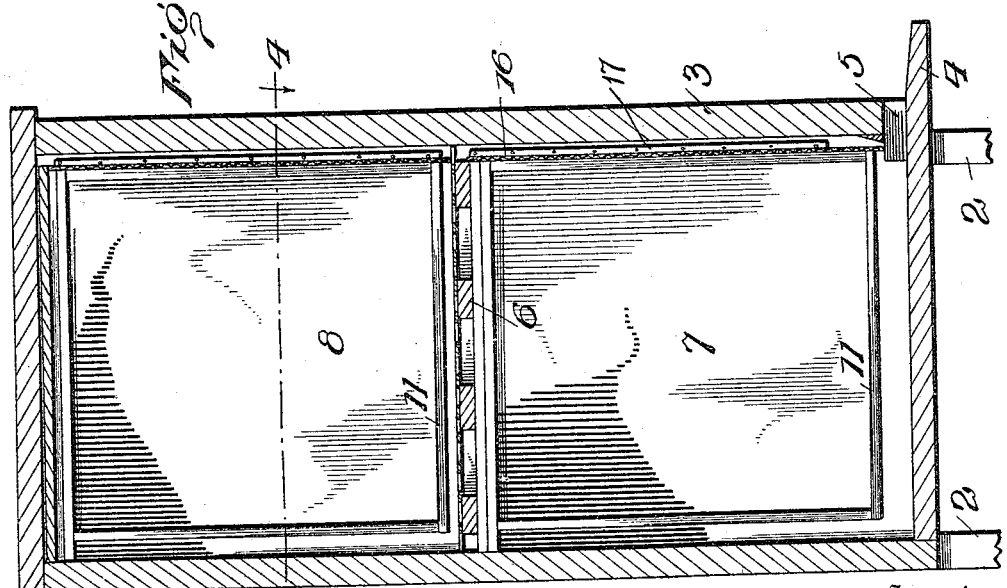

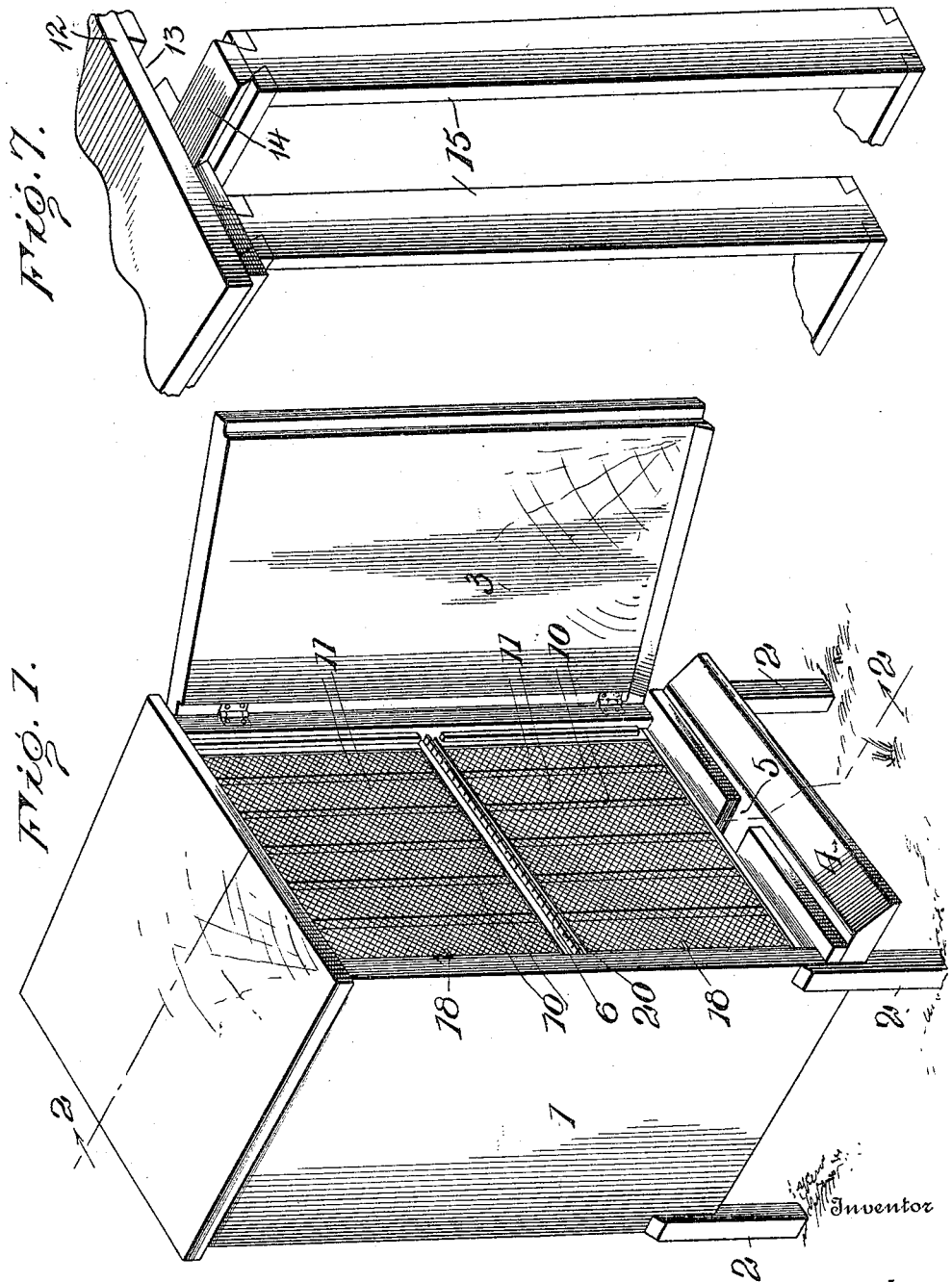
J. W. JORDAN.
BEEHIVE.
APPLICATION FILED MAR. 7, 1916.
1,211,587.
Patented Jan. 9, 1917.
3 SHEETS—SHEET 1.

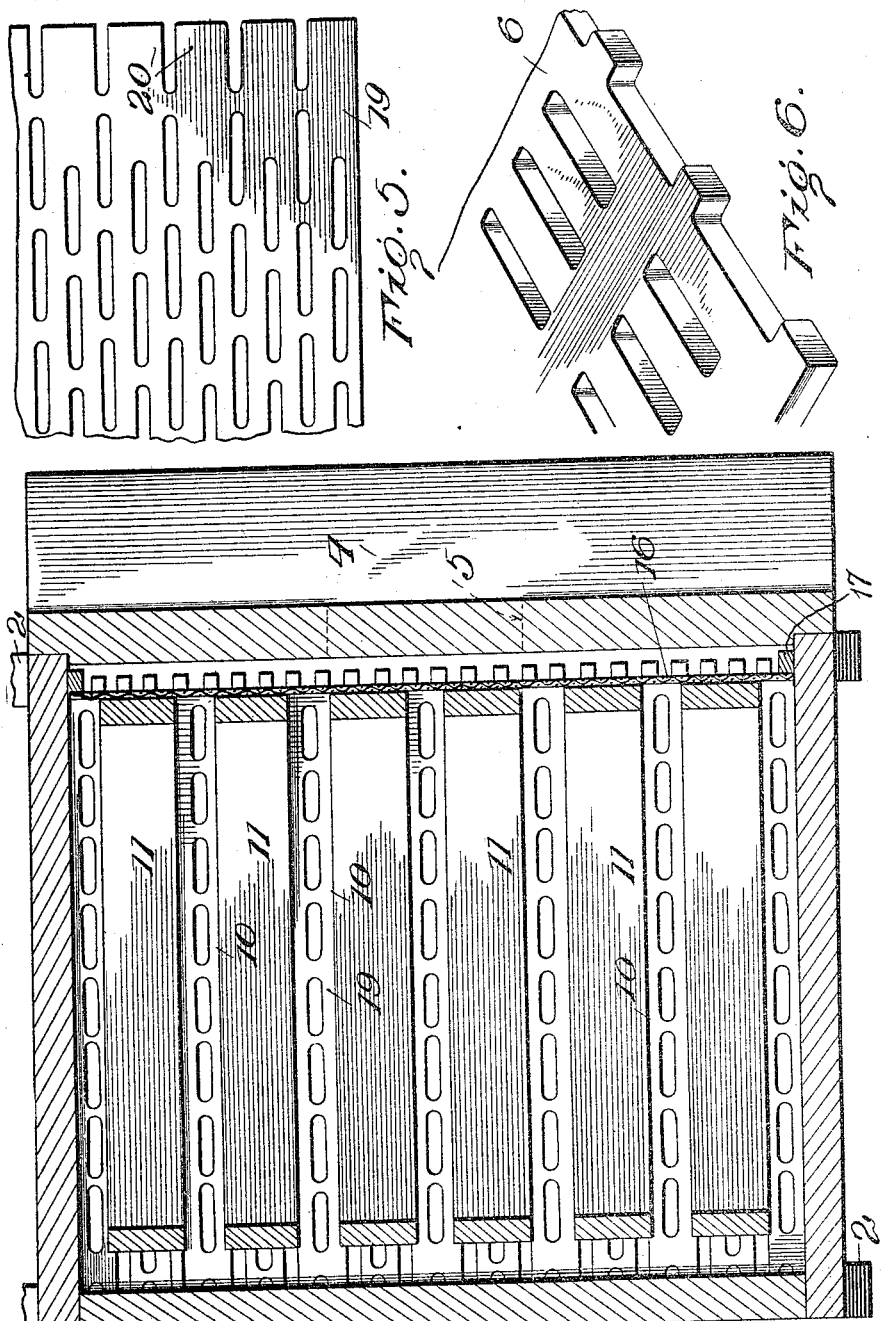

UNITED STATES PATENT OFFICE.

JAMES WILLIAM JORDAN, OF WILLIAMSBURG, KENTUCKY.

BEEHIVE.

1,211,587.　　　Specification of Letters Patent.　　　Patented Jan. 9, 1917.

Application filed March 7, 1916.　Serial No. 82,688.

*To all whom it may concern:*

Be it known that I, JAMES W. JORDAN, a citizen of the United States of America, residing at Williamsburg, in the county of Whitley and State of Kentucky, have invented certain new and useful Improvements in Beehives, of which the following is a specification.

My invention relates to bee-hives, and the primary objects thereof are to provide means for confining the bees in the brood-box while the honey is being removed from the super; to provide means whereby all of the bees may be driven from the brood-box to the super or vice-versa, thereby permitting withdrawal of the larvæ and preventing the ravages of rodents and the like, as well as an exchange of racks, the confinement of the queen bee in the brooder box and the starting of new colonies.

To the accomplishment of the recited objects, and others coördinate therewith, the preferred embodiment of my invention resides in that arrangement of parts shown in the accompanying drawings, hereinafter described, and embraced within the scope of the appended claim.

In said drawings, Figure 1 is a perspective view of the bee-hive embodying my invention. Fig. 2 is a vertical sectional view taken along lines 2—2 of Fig. 1. Fig. 3 is a similar view with the frame and screen, of the super, and the slide between the super and brood-box removed. Fig. 4 is a transverse section taken along lines 4—4 of Fig. 2. Fig. 5 is a fragmentary plan view of the queen bee excluder. Fig. 6 is a perspective view of a portion of the bee-escape board, and Fig. 7 is a fragmentary perspective view of one of the frames.

Referring more particularly to the drawings for a detailed description of my invention, the numeral 1 designates a substantially rectangular shaped inclosure supported by legs 2, and having a door 3 and a baseboard 4 provided with an entrance, as 5. The interior of the main inclosure is divided transversely by a bee-escape board 6 into two compartments of approximately uniform dimensions, the brood-box 7 and the super 8. At the top of each compartment are arranged track-ways 9 adapted for removably supporting the brood-frames 10 and super-frames 11, respectively, the frames being identical in structure, and comprising a headboard 12 with dove-tail grooves 13 on its under side extending to a point short of the rear wall of the inclosure and designed to receive the complemental tenons 14 of a plurality of racks 15. Manifestly the frames may be introduced or withdrawn as a unit, or if desired, the racks may be inserted or removed independently. The fact that the racks, like the grooves 13, do not extend clear across the compartments allows sufficient space to permit the bees to have ready access to the racks at all times. The front of each frame is inclosed by a screen 16 which is detachably supported by a vertical retaining strip 17 on one side and fastening devices 18 upon the other side.

Lying upon the bee-escape board 6 is a queen bee excluder 19 having its forward marginal edge 20 reinforced and projecting beyond the edge of the bee-escape board to afford a support for the screen 16 of the super, as will be seen upon inspection of Fig. 2. An imperforate slide, as 21, having the same general contour as the excluder, is adapted to be superposed with respect to the excluder, when certain contingencies arise, and this too will support the edge of the screen when in the position exhibited in Fig. 3.

Ordinarily, a bee-hive is robbed by smoking the bees down from the super to the brood-box, and the honey drips upon the bees, which thereupon become angered and return to defend their home. In my improved hive the bees can be temporarily imprisoned by slipping a block of wood, as 22, in the entrance 5 of the hive before the bees begin to fly out in the morning. Then upon opening the door 3, and allowing smoke to pass through the screen 16 into the super, the bees will descend into the brood-box, when the slide 21 is placed between the two compartments and serves to confine the bees in the brood-box. The honey can now be removed with impunity either by withdrawing one rack at a time or by taking out the entire frame. Owing to the facility with which the bees may be constrained from one compartment to the other, the larvæ may be removed at any time and thereby prevent the ravages of rodents, pests and the like. Another advantage resides in the fact that the racks are interchangeable which provides for strengthening the weaker colonies whenever it is found desirable. Still further advantages are that by means of the slide and the excluder, the queen bee may be kept in the brooder-box to raise her young; and that the worker bees may be driven from the brooder-box into the super, leaving the queen or queens, as the case may be, in the brooder-box. If more than one queen is found she may be placed in a new hive with a few workers and thus start a new colony. In the event only one queen is discovered, the rack with the cell and a quantity of bees may be taken to a new hive—which also serves to increase one's stock of bees.

It should be understood that in broader aspects my invention comprehends the employment not only of the various means described, but of similar means for performing the recited functions. It is desired to reserve the right to effect such changes and modifications as may be deemed to come fairly within the scope of the appended claim.

What I claim is:

In a bee-hive, the combination of an inclosure having two compartments, one of said compartments containing a brood-frame while the other compartment contains a super-frame, a bee-escape board between the frames, a screen for each compartment, a slide superposed with respect to the escape-board, said slide being adapted to support the super-screen while the base-board supports the lower screen, and means at opposite sides of the inclosure for detachably retaining the screens.

In testimony whereof I affix my signature in the presence of two witnesses.

JAMES WILLIAM JORDAN.

Witnesses:
E. L. STEPHENS,
T. W. STEELY.

Copies of this patent may be obtained for five cents each, by addressing the "Commissioner of Patents, Washington, D. C."